United States Patent
Devine

[11] Patent Number: 6,119,984
[45] Date of Patent: Sep. 19, 2000

[54] LOW SHOCK ANTI-FRICTION RELEASE DEVICE

[75] Inventor: Edward J. Devine, Laurel, Md.

[73] Assignee: Swales Aerospace, Beltsville, Md.

[21] Appl. No.: 09/356,200

[22] Filed: Jul. 16, 1999

Related U.S. Application Data

[60] Provisional application No. 60/144,308, Jul. 16, 1999.

[51] Int. Cl.[7] ..................................................... B64G 1/44
[52] U.S. Cl. ....................................................... 244/158 R
[58] Field of Search ............................... 244/173, 158 R, 244/161, 137.4; 294/82.26, 82.32, 82.3; 24/648; 89/1.51, 1.58, 1.59

[56] References Cited

U.S. PATENT DOCUMENTS

| | | | |
|---|---|---|---|
| 166,452 | 8/1875 | Brown et al. | |
| 2,668,412 | 2/1954 | Abramson | 60/39.14 |
| 3,992,257 | 11/1976 | van Erp et al. | 176/36 C |
| 4,347,023 | 8/1982 | Rizos | 410/32 |
| 4,397,433 | 8/1983 | Guitaut et al. | 244/137.4 |
| 4,419,033 | 12/1983 | Roth et al. | 410/32 |
| 4,682,804 | 7/1987 | Palmer et al. | 294/82.26 |
| 4,823,035 | 4/1989 | Kudla et al. | 310/68 C |
| 4,911,400 | 3/1990 | Gruber | 251/11 |
| 5,025,627 | 6/1991 | Schneider | 60/527 |
| 5,377,554 | 1/1995 | Reulein et al. | 74/2 |
| 5,396,770 | 3/1995 | Petot et al. | 60/531 |
| 5,695,306 | 12/1997 | Nygren, Jr. | 411/433 |

FOREIGN PATENT DOCUMENTS 0 441 669 A1  8/1991  European Pat. Off. .

OTHER PUBLICATIONS

Nygren 29th Aerospace Mechanisms Symposium May 1995 "Development of a High Force Thermal Latch".

*Primary Examiner*—Galen L. Barefoot
*Attorney, Agent, or Firm*—Roberts Abokhair & Mardula LLC

[57] ABSTRACT

A pin puller combines a metal alloy actuator with an anti-friction release mechanism, according to a bilaterally symmetric geometry. The actuator operates based on a metal alloy that has a relatively low melting temperature. The anti-friction tension release mechanism ensures that only negligible friction forces need to be overcome to operate the tension release mechanism. Thus, the metal alloy actuator is isolated from the large tension force that bears on the tension release mechanism. The bilateral symmetric aspect of the structure provides for mechanical redundancy, so that, in the event that one half of the pin puller fails, it is sufficient that the other half operate properly for the tension to be successfully released. This pin puller avoids premature release because it is not susceptible to static electricity, electromagnetic radiation, or high ambient temperatures. The melting point of the metal alloy in the actuator is arbitrarily selectable so as to be higher than the highest foreseeable ambient temperature. The pin puller also avoids generation of large shock waves due to its slow speed of operation and because of the gradual release interaction of mechanical parts within the anti-friction release mechanism.

82 Claims, 6 Drawing Sheets

LOW SHOCK ANTI-FRICTION RELEASE DEVICE

RELATED APPLICATIONS

The subject matter of the present application is related to that of U.S. patent application. Ser. No. 09/459,799 by Michael J. Hersh and Edward J. Devine, filed Dec. 13, 1999, and claiming priority benefit of provisional application Ser. No. 60/144,308, filed Jul. 16, 1999. The present application and application Ser. No. 09/459,799 are commonly assigned.

BACKGROUND OF THE INVENTION

1. Field of the Invention

The present invention is directed to the field of devices for restraining and selectively releasing a tension force. More particularly, the present invention is directed to the field of devices that deploy folded structures on a spacecraft after launch.

2. Background Art

It is common in the space industry to launch a spacecraft with some of its parts folded down against the exterior of the spacecraft. For example, when the spacecraft is a solar powered earth satellite, the large solar panels must be folded down so that the spacecraft can fit inside the payload space of a launch vehicle. Antennae, sensors, and nuclear power plants (mounted on extensible members) are examples of other bulky appendages that may need to be folded down to the side of a spacecraft during launch.

After the spacecraft has been placed in space, the folded parts must then be reliably deployed. Typically, this is done via a spring bias that tends to urge the folded part into an extended position. During launch, a retention member, which will later be released upon a remote command, counters the spring bias. The retention member is commonly referred to in the art as the "pin," although it sometimes is not literally in the form of a pin. The tension release device that releases the retention member (or pin) is commonly known in the art as the "pin puller."

Pyrotechnic devices have been long used as tension release devices. Commonly known as exploding nuts or exploding bolts, pyrotechnic devices are a mature technology that has the advantages of providing for very secure retention of folded structures and deploying reliably, that is, they are mechanically strong and have a low failure rate.

One disadvantage of pyrotechnics is that they are susceptible to premature firing. Static electricity and electromagnetic radiation can accidentally set them off. Premature firing causes untimely deployment of folded parts and other potentially catastrophic results. Thus, these prior art tension release devices are risky due to their tendency to prematurely actuate as a result of ambient conditions.

Another disadvantage common to the prior art tension release (i.e., pin puller) schemes is that they are high shock devices. Pyrotechnic devices, by their very nature, explode. The explosion sends mechanical shock waves all through the spacecraft. In addition, they impart subtle forces on the orbital mechanics of the vehicle. These shock waves place additional stress on the spacecraft that can only increase the risk of failure of delicate systems aboard the spacecraft, such as electronic circuits, electrical connectors, and optical sensors.

Another approach to tension release devices has been paraffin actuators. Upon receiving a remote command, the paraffin actuator develops a linear mechanical force to actuate a release mechanism, thereby deploying the folded parts of the spacecraft. The paraffin actuator operates based on the phenomenon that when paraffin changes from solid phase to liquid phase it undergoes a substantial expansion. A cylindrical slug of solid paraffin is loaded in a cylinder with a piston disposed against it. When a remote deployment command is received, heat is applied to the cylinder containing the paraffin, causing the paraffin to undergo a phase change. The resulting expansion of the paraffin forces the piston to move through the cylinder and develops a mechanical force. Pin pullers based on paraffin actuators also generate shock waves due to the suddenness with which the restraining force is released.

A failed attempt at improving on the above devices involved the use of a low temperature melting point metal alloy as a fusible link in the tension release device. This device was initially described by William D. Nygren, "Development of a High Force Thermal Latch" 29th Aerospace Mech. Symposium, May 17–19, 1995. This device is also described in U.S. Pat. No. 5,695,306. Upon receiving a remote command for deployment, heat was applied to the fusible link 100, 300 so that it would melt, thereby causing the tension release device to undergo a mechanical shift so as to permit release of the pin. This system failed because the fusible link 100, 300 was directly bearing more force than it could handle. The fusible link 100, 300 was unable to withstand the mechanical forces exerted on it and, thus, the fusible link 100, 300 tended to flow prematurely due to tension forces alone. Accordingly, this prior art tension release device is not commercially viable. The force that a tension release device must restrain is on the order of several thousand pounds, typically 5,000 to 10,000 pounds, for a folded solar panel array.

Another prior art tension release device is disclosed in published EPO patent application no. 0 441 669. This tension release device restrains a pin 8 that is holding down folded solar panels 3A, 3B on a spacecraft 4. The pin 8 is held in place by balls 12a, 12b, 12c, which are in turn held in place by a circular cam 16. When pyrotechnic devices 23 ignite, the restraint pin 22 is removed so that the cam 16 is free to rotate and thereby move the balls 12a, 12b, 12c downward and release the pin 8. By its use of pyrotechnic devices, it is clear that this invention does not contemplate solving either the problem of premature actuation or the problem of generation of large shock waves.

Thus, what is needed is a tension release device (i.e., pin puller) that operates reliably, that avoids premature actuation, and that avoids generation of large shock waves due to sudden actuation.

SUMMARY OF THE INVENTION

It is an object of the present invention to provide a tension release device that operates reliably.

It is another object of the present invention to provide a tension release device that avoids premature operation.

It is a further object of the present invention to provide a tension release device that avoids generation of large shock waves.

It is still another object of the present invention to provide a spacecraft with one or more folded appendages, wherein the appendages unfold reliably.

It is yet another object of the present invention to provide a spacecraft with one or more folded appendages, wherein premature unfolding of the appendages is avoided.

It is a further object of the present invention to provide a spacecraft with one or more folded appendages, wherein generation of large shock waves is avoided when the appendages are unfolded.

It is yet another object of the present invention to provide an actuator that develops an actuation force based on a phase change of a metal alloy.

It is yet another object of the present invention to provide an actuator that develops an actuation force reliably, avoids premature actuation, and avoids generation of large shock waves upon actuation.

To achieve the above objects the present invention is embodied as a tension release device that combines a metal alloy actuator with an anti-friction release mechanism, according to a bilaterally symmetric geometry. One aspect of a tension release device according to the present invention is an actuator that operates based on a metal alloy that has a relatively low melting temperature. Another aspect of a release device according to the present invention is an anti-friction release mechanism. Because negligible friction forces need to be overcome to operate the anti-friction release mechanism, the metal alloy actuator is isolated from the large tension force that bears on the release mechanism.

Still another aspect of a tension release device according to the present invention is a bilateral symmetric structure that provides for mechanical redundancy. In the event that one half of the tension release device fails, it is sufficient that the other half operate properly for the tension to be successfully released.

To obtain certain of the above objects of the invention, a tension release device is provided that retains a pin that is subject to a tension force and for releasing the pin on command. The tension release device includes an actuator and an anti-friction release mechanism. The actuator develops a force at a selected time, based on a phase change of a metal alloy contained in the actuator. The anti-friction release mechanism retains the pin until the selected time, whereupon it releases the pin in response to the force developed by the actuator.

To obtain some of the above objects of the invention, a tension release device is provided that retains a pin that is subject to a tension force and for releasing the pin on command. The tension release device includes an actuator and an isolation structure. The actuator develops an actuation force at a selected time, based on a phase change of a metal alloy contained in the actuator, the actuation force having a substantially smaller magnitude that the tension force. The isolation structure substantially isolates the actuator from the tension force so that the pin is released in response to the comparatively small actuation force.

To obtain others of the above objects of the invention, a spacecraft is provided that includes a main body, an appendage attached to the periphery of the main body, and a tension release device attached to the periphery of said main body. The tension release device initially maintains the appendage in a folded configuration and releases the appendage to unfold at a selected time after the spacecraft has been placed into space. The tension release device includes an actuator and an anti-friction release mechanism. The actuator develops a force at a selected time, based on a phase change of a metal alloy contained in the actuator. The anti-friction release mechanism retains the appendage via a pin until the selected time, whereupon the anti-friction release mechanism releases the pin in response to the force developed by the actuator.

To obtain other ones of the above objects, the invention is embodied as an actuator that provides for a linear actuation motion at a selected time. The actuator includes a cylinder having an end wall, a piston disposed inside the cylinder, a spring disposed so as to bias said piston to move toward the end wall, a mass of metal alloy disposed between the piston and the end wall. The actuator also includes a heat source, disposed adjacent to the cylinder, for generating heat when energized at the selected time so as to melt the mass of metal alloy and thereby release energy stored in the spring. As a result, the release of energy stored in the spring moves the piston and provides the linear actuation motion, the linear actuation motion being caused solely by the spring.

BRIEF DESCRIPTION OF THE DRAWINGS

Other objects and advantages of the present invention will become clear as the invention is described below, with reference to the drawings in which.

DETAILED DESCRIPTION OF THE INVENTION

Figure 1:
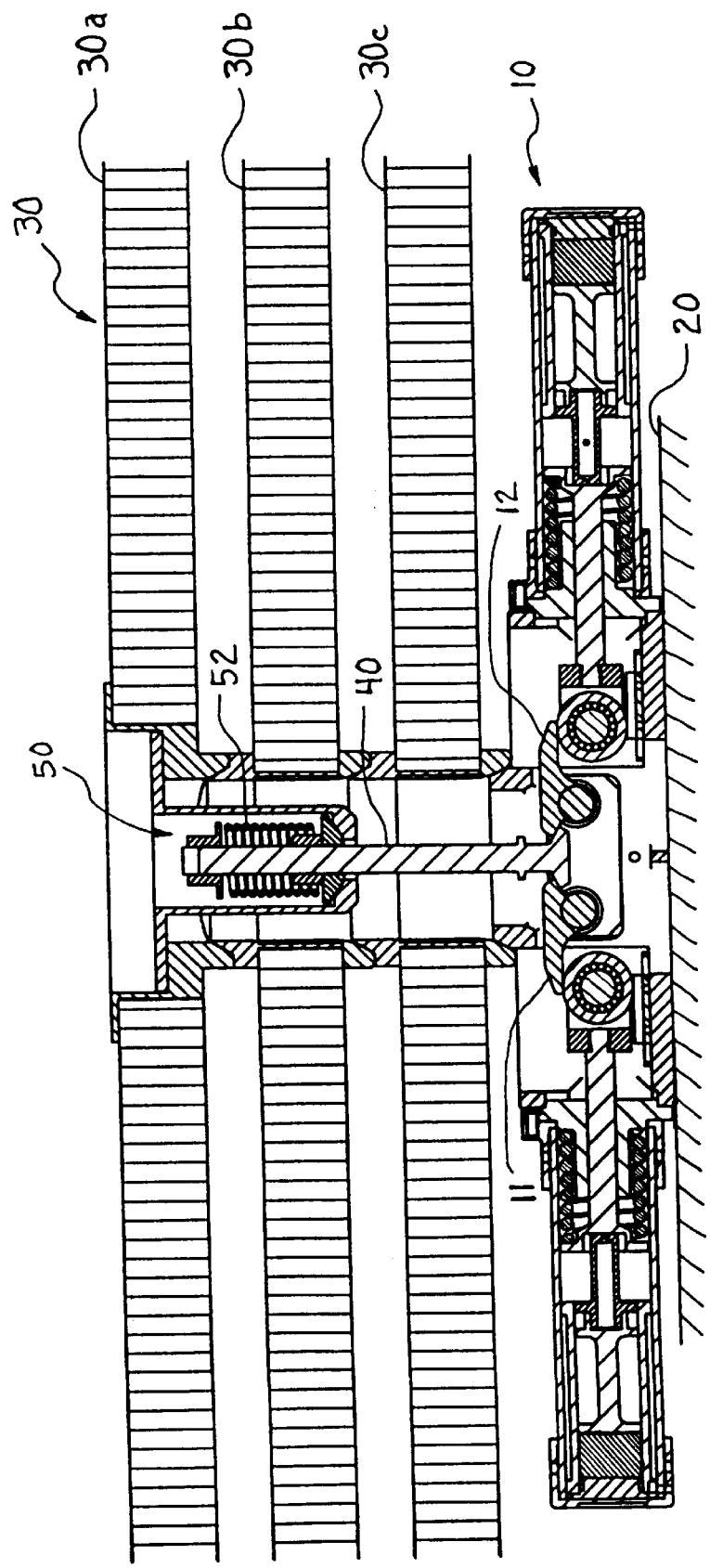
FIG. 1 illustrates a cross-section view of a pin puller, according to an embodiment of the present invention, disposed beneath a folded solar panel array.

FIG. 1 illustrates a pin puller 10 according to the present invention installed on a spacecraft 20. A solar array 30 is folded into a first segment 30a, a second segment 30b, and a third segment 30c. A pin 40 is connected to the third segment 30c of the solar array 30, and projects down through the second and first segments 30b, 30a to engage the pin puller 10. The pawls 11, 12 of the pin puller 10 directly engage the pin 40 to hold the solar array 30 in a folded position.

The pin 40 is connected to the third segment 30c by a pin retraction mechanism 50. When the pin puller 10 operates to release the pin 40, the pin retraction mechanism 50 functions to retract the pin 40 through the third segment 30c to prevent the pin 40 from binding with either of the first and second segments 30a, 30b. The pin 40 is retracted by means of the force exerted by compressed spring 52 as it expands.

Figure 2:
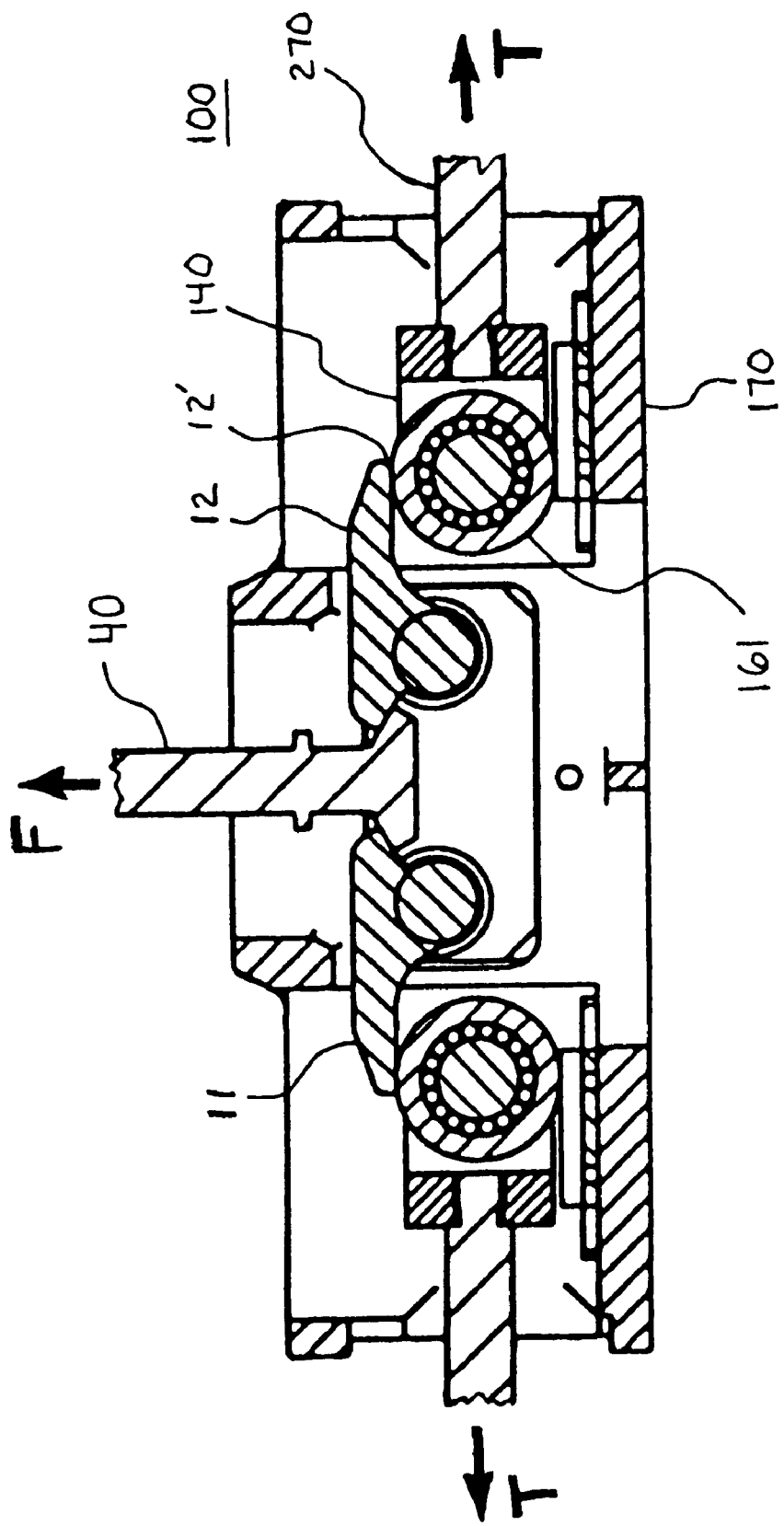
FIG. 2 illustrates a cross-section detail view of the tension release mechanism aspect of a pin puller according to an embodiment of the present invention.
Figure 3:
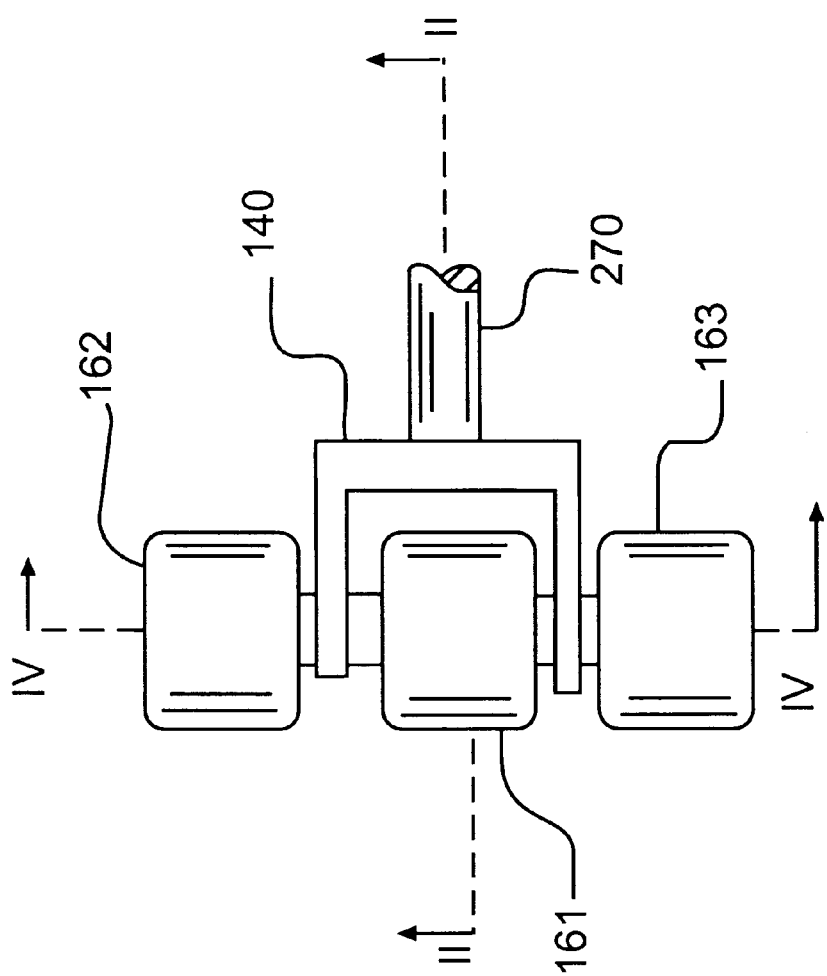
FIG. 3 illustrates a plan detail view of the tension release mechanism aspect of a pin puller according to an embodiment of the present invention. Section line 11—11 indicates how FIG. 3 corresponds to the cross-section illustration of FIG. 2. Section line IV—IV indicates how FIG. 3 corresponds to the cross-section illustration of FIG. 4.

The anti-friction tension release aspect of the invention is illustrated in FIG. 2, which shows a landscape view of the tension release mechanism 100 (in cross-section), and in FIG. 3, which shows a plan view of a portion of the tension release mechanism 100. This aspect of the invention is described as follows.

Two pawls 11, 12 hold a pin 40 in place against a force F tending to pull on the pin 40. In a typical application, the pin 40 is holding down a furled solar array 30 (see FIG. 1) to the side of a spacecraft 20 (see FIG. 1). At an appropriate time (e.g., when orbit has been achieved), the tension release mechanism 100 acts to release the pin 40 to move in response to the force F, thereby permitting the solar array 30 to unfurl.

FIG. 2 shows an embodiment that has bilateral symmetry. This gives the system redundancy in that the pin will be released even if only one side functions properly. Only the function of the right side is described below. The function of the left side is identical to that of the right side, except it operates in mirror image. Either of the two sides may be eliminated and a fixed member substituted in place of the pawl for that side.

When a tension force T is input to the release device, the shuttle 140 moves away from the center of the device (to the right). When the shuttle 140 has moved far enough, the pawl 12 is allowed to rotate (which it is biased to do due to the force F) clockwise. The rotation of the pawl 12 releases the pin 40.

The anti-friction aspect of the tension release mechanism 100 is due to the configuration of three anti-friction bearings 161, 162, 163 (refer to FIG. 3) that provide friction relief between the shuttle 140, the pawl 12, and the housing 170. Bearing 161 provides for a rolling interaction between the pawl 12 and the shuttle 140, and bearing 162 and bearing 163 provide for a rolling interaction between the shuttle 140 and the housing 170. Thus, there is no sliding friction to overcome when the shuttle 140 starts to move. The only resistance to movement is rolling resistance of the three bearings 161, 162, 163. This is important because the force F that loads the tension release mechanism is about two orders of magnitude greater than the tension force T used to actuate the release. Thus, the rolling resistance of three ball bearings is negligible compared to the prior art alternative: the resistance that would be provided by a sliding friction force.

Figure 4:
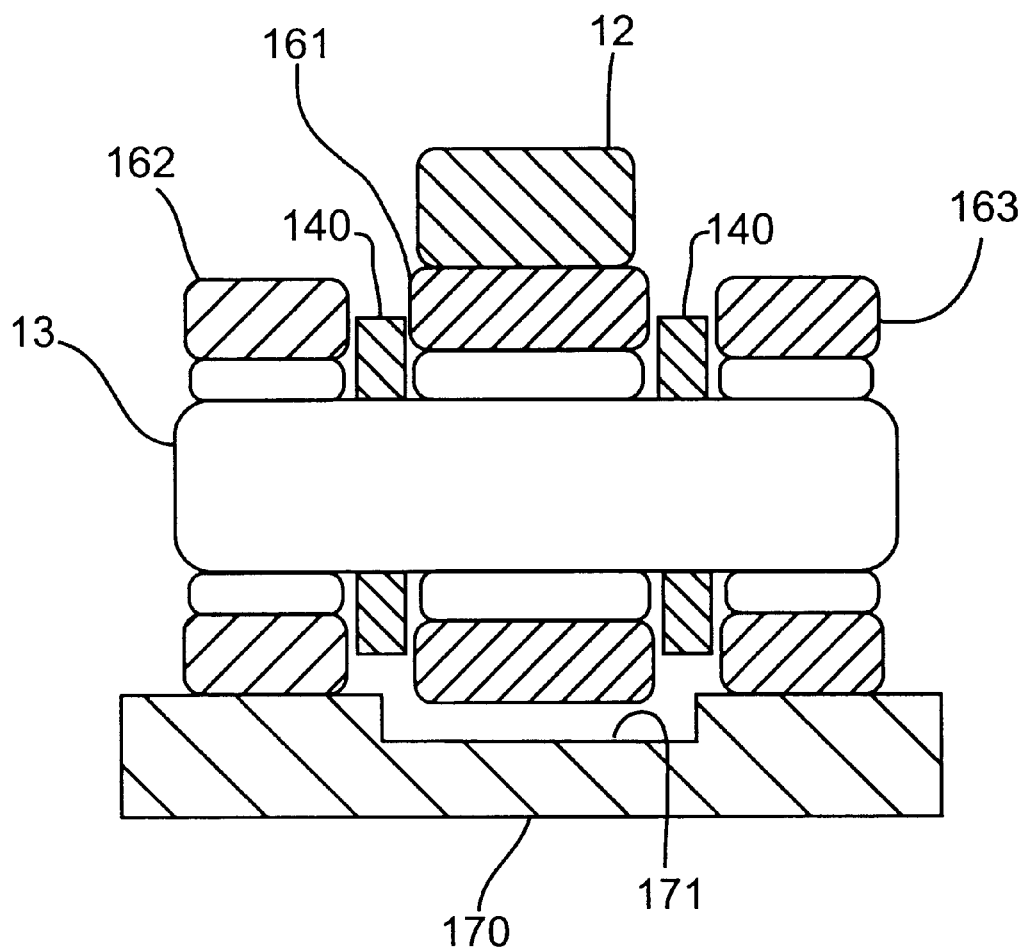
FIG. 4 illustrates a cross-section detail view of the tension release mechanism aspect of a pin puller according to an embodiment of the present invention.

The section view provided by FIG. 4 shows that the three anti-friction bearings 161, 162, 163 are all coaxially disposed on a common shaft 13, which is connected to the shuttle 140. The two outer bearings 162, 163 roll only against the housing 20, whereas the middle bearing 161 rolls only against the pawl 12. As illustrated, this the middle bearing 161 is prevented from contacting the housing 170 due to a depressed portion 171. As an alternate embodiment, the same result is achieved by simply making the outside diameters of the outer bearings 162, 163 greater than that of the middle bearing 161, thereby obviating the need for the depressed portion 171.

As illustated, the bearings each have an an outer race and plural rolling elements that are disposed between the shaft 13 (which acts as an inner race) and the outer race. The rolling elements are preferably formed of a ceramic material. Silicon nitride is a preferred ceramic material for the rolling elements. The differing materials are chosen so as to minimize friction while avoiding the need for a lubricant.

According to an alternate embodiment, the bearing parts are all metal. In this case a lubricant is used. For use aboard a satellite, the lubricant is selected from the class of space lubricants, which are well known to those who work in that art.

According to an alternate embodiment, each of the bearings has its own distinct inner race that is fitted over the shaft 13, rather than using the shaft itself as an inner race common to all the bearings.

Figure 5:
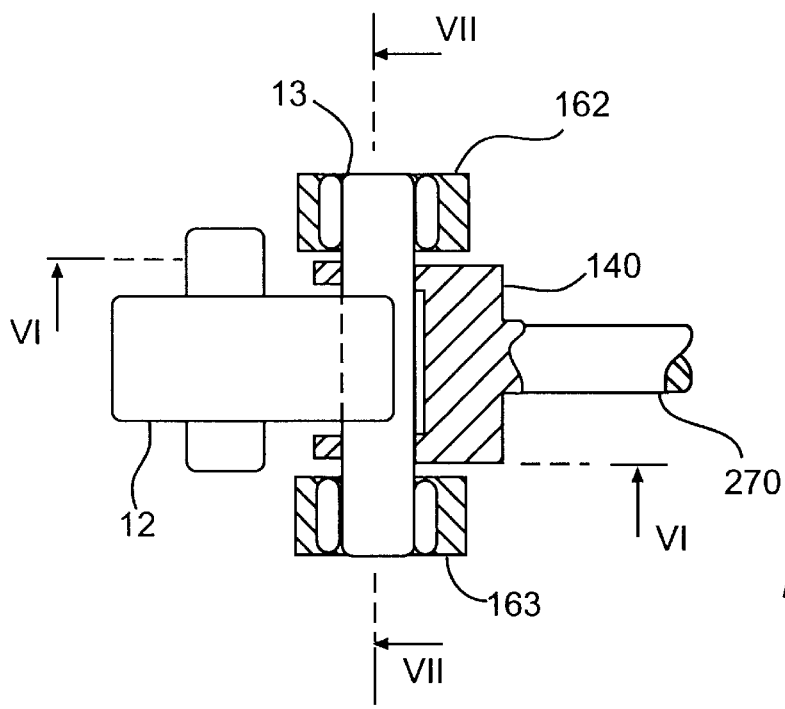
FIG. 5 illustrates a partial-section plan view of the tension release mechanism aspect of a pin puller according to an alternate embodiment of the present invention. Section line VI—VI indicates how FIG. 5 corresponds to the cross-section illustration of FIG. 6. Section line VII—VII indicates how FIG. 5 corresponds to the cross-section illustration of FIG. 7.
Figure 6:
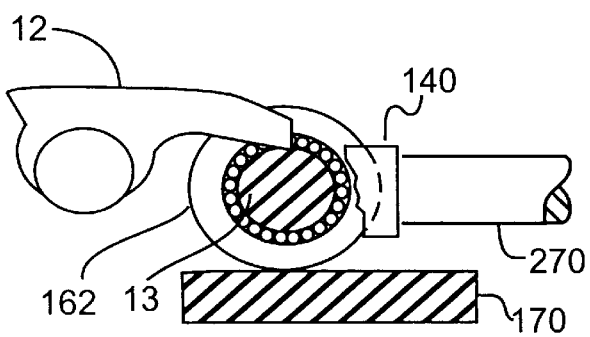
FIG. 6 illustrates a first partial cross-section detail view of the tension release mechanism aspect of a pin puller according to the alternate embodiment of FIG. 5.
Figure 7:
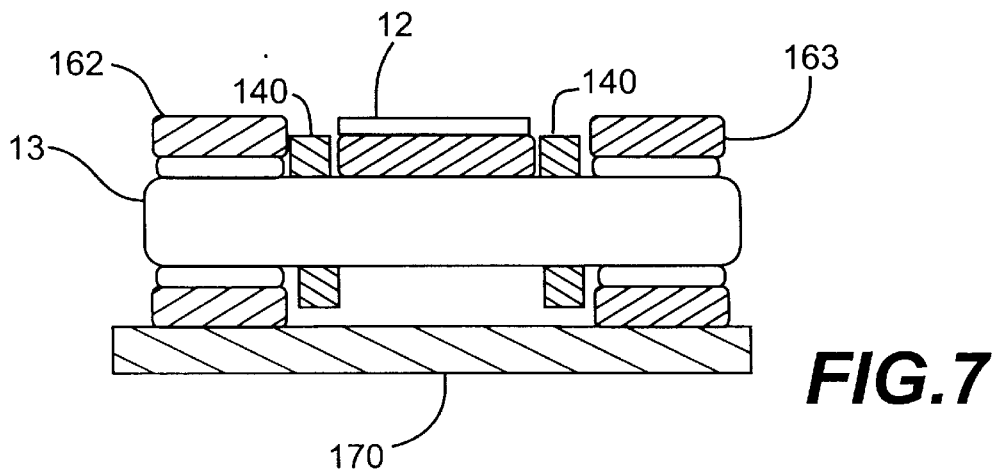
FIG. 7 illustrates a second partial cross-section detail view of the tension release mechanism aspect of a pin puller according to the alternate embodiment of FIG. 5.

According to an alternate embodiment, illustrated in FIGS. 5–7, only two bearings are employed. FIG. 5 is a plan view of a partial section of the tension release mechanism where only two outer bearings 162, 163 are used. No middle bearing is used and the pawl 12 rolls directly on the shaft 13. The contact of the pawl 12 directly on the shaft 13 is best shown in FIG. 6. As FIG. 7 shows, there is no need, according to this alternate embodiment, for a depressed region because no middle bearing is used.

The rolling elements may be either cylindrical rollers or balls. The preferred type of bearing is a so-called needle bearing that has rollers as rolling elements. The needle bearing is preferred due to its ability to handle large forces and its low rolling resistance, anti-friction properties. The inner and outer races are both preferably formed of a metal such as stainless steel.

Figure 8:
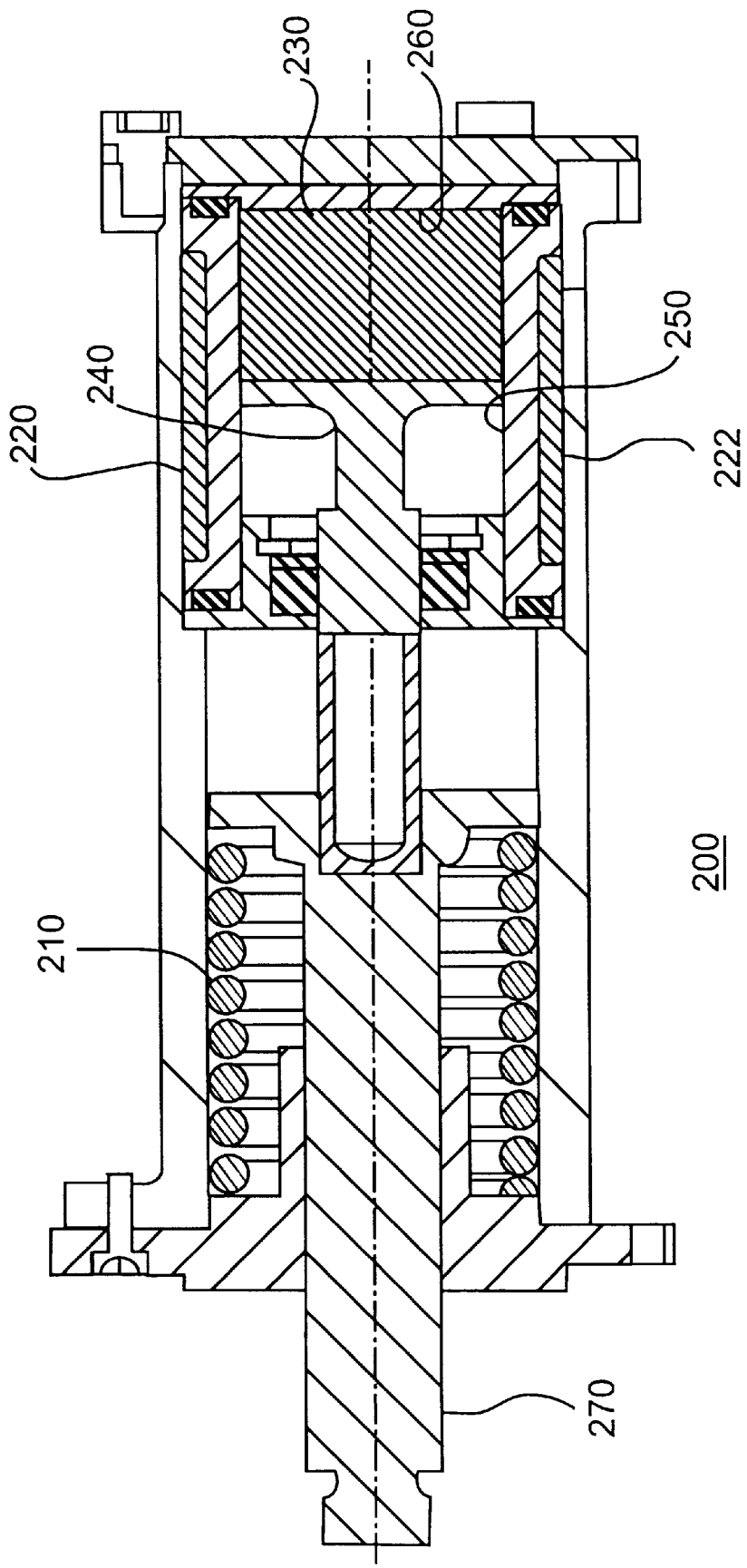
FIG. 8 illustrates a cross-section detail view of the metal alloy actuator aspect of a pin puller according to an embodiment of the present invention.

The tension force T for operating the tension release mechanism is provided by the metal alloy actuator 200. The actuator aspect of the present invention is illustrated in FIG. 8, and is described as follows.

The metal alloy actuator 200 is for one-time use only [i.e., it cannot be reused without disassembly]. At a desired time (e.g., when orbit has been achieved), electrical energy is applied to the metal alloy actuator 200, thereby causing stored mechanical energy to be released. Energy is stored mechanically in the spring 210, which is initially in a state of compression. When electricity is applied to the Kapton heaters 220, 222, the low melting point metal alloy member 230 melts. Force from the compressed spring causes the molten alloy to flow slowly through the gap between the piston 240 and the cylinder wall 250, thereby permitting the piston 240 to move to the right towards the end wall 260. As the molten alloy flows and the piston 240 moves, the energy stored in the spring 210 is gradually released. The mechanical output of the actuator 200 is via the shaft 270 that applies a tension force T by moving to the right.

The anti-friction release mechanism 100 makes possible a substantial weight savings because the metal alloy actuator 200 can be made much smaller than comparable actuators in the prior art. Since no static friction forces (other than the negligible rolling resistance of the bearings) need to be overcome to release the retained pin, the actuator only needs to develop a relatively small tension force T. The relative difference in force magnitude is approximately two orders of magnitude. Accordingly, since it develops a small force, the actuator can be made physically smaller, and thus, lighter than in prior art pin pullers.

The release device as described herein generates shock waves that are greatly reduced compared with prior art devices. Generation of shock waves is reduced primarily because the release is done gradually. There are two features of the release device that make the release gradual.

One is the fact that the actuator 200 moves slowly as a result of the fact that the molten metal alloy is very viscous and flows out from between the piston 240 and the end wall 260 only very slowly.

The other feature that contributes to the gradual nature of the release action of the release device is the mechanical interaction between the pawl 12 and the bearing 161 As the bearing 161 begins to move away from the pawl 12, the initial phase of the rotation of the pawl 12 is slow while the extreme tip 12' of the pawl 12 follows the receding curve of the periphery of the bearing 161. The pawl 12 is free to rotate unhindered by the bearing 161 only after the pawl 12 has first rotated through a substantial arc of rotation. By the time bearing has receded that far, though, the tension in the pin 40 will already have been gradually released by the rotation of the pawl.

In addition to the redundancy of having two actuators (the bi-lateral symmetry feature), reliability is further enhanced by the use of plural heaters 220, 222 for each of the actuators. In the event that one of the heaters 220, 222 fails, the heat provided by the remaining heater will be sufficient to melt the metal alloy, albeit more slowly than if both were operational.

The heaters are preferably thin, flexible Kapton resistance heaters. The heaters need not necessarily be Kapton heaters. Other types of resistance heaters are appropriate for use in the present invention. Generally, any compact, reliable heat sources are appropriate.

According to an alternative embodiment, the speed of operation of the tension release device is made faster by increasing how fast the actuator operates. This is accomplished by decreasing the resistance to fluid flow of the molten metal. Holes (not shown) for decreasing fluid flow resistance are formed in the face of the piston 240. Optionally, the piston 240 is made of a porous material. As another option, holes are formed in the end face 260 so that the molten alloy flows into an auxiliary chamber (not shown) behind the end face 260.

The melting point of the metal alloy is chosen to be safely above any foreseeable ambient temperature to which the spacecraft will be exposed. For application in the context of a spacecraft, the melting temperature of the alloy is preferably in the range of about 100° C. to about 150° C. Optimally, the melting temperature of the alloy is approximately 125° C. For spacecraft applications, the eutectic alloy of bismuth (55.5%) and lead (44.5%) gives an optimal melting point of 123.8° C. Other alloys or materials could be employed for other operating temperatures.

The invention can also be practiced using a paraffin type actuator in lieu of the metal alloy actuator. Although the metal alloy actuator is the preferred structure, many of the advantages of the present invention are achieved when a paraffin actuator is used.

The present invention is not limited to space applications and is useful in any context where a tension force is to held reliably and then released reliably at a selected time.

The present invention is described above in terms of a preferred embodiment. However, it will be appreciated by persons of skill in the art that various modifications and improvements may be made to the described embodiment without departing from the scope of the invention as disclosed. The invention is limited only by the appended claims.

What is claimed is:

1. A tension release device for retaining a pin subject to a tension force and for selectively releasing the pin, the tension release device comprising:
    an actuator that develops a force at a selected time, based on a phase change of a metal alloy contained in said actuator, and
    an anti-friction release mechanism that retains the pin until the selected time, whereupon the anti-friction release mechanism releases the pin in response to the force developed by said actuator.

2. The tension release device of claim 1, wherein said actuator comprises:
    a cylinder having an end wall;
    a piston disposed inside said cylinder;
    a spring disposed so as to bias said piston to move toward said end wall;
    a mass of said metal alloy disposed between said piston and said end wall; and
    a heat source disposed about said cylinder.

3. The tension release device of claim 2, wherein composition of said metal alloy is selected so that said metal alloy has a melting temperature greater than foreseeable ambient temperatures.

4. The tension release device of claim 3, wherein said melting temperature is in the range of about 100° C. to 150° C.

5. The tension release device of claim 4, wherein said melting temperature is about 125° C.

6. The tension release device of claim 2, wherein said metal alloy is comprised essentially of lead and bismuth.

7. The tension release device of claim 6, wherein said metal alloy is the eutectic alloy of bismuth and lead.

8. The tension release device of claim 6, wherein said metal alloy contains about 44.5 percent lead and about 55.5 percent bismuth.

9. The tension release device of claim 2, wherein said heat source, when energized, raises the temperature of said mass of metal alloy above the melting point of said metal alloy.

10. The tension release device of claim 9, wherein said mass of metal alloy undergoes a phase change when said heat source is energized.

11. The tension release device of claim 10, wherein said mass of metal alloy is solid phase prior to said heat source being energized, and said mass of metal alloy changes from solid phase to liquid phase when said heat source is energized; and
    wherein the liquid phase mass of metal alloy flows out of the space between said piston and said end wall, thereby permitting said piston to move toward said end wall.

12. The tension release device of claim 2, wherein said heat source comprises plural independent heating elements.

13. The tension release device of claim 12, wherein each of said heating elements is a thin, flexible resistance heater.

14. The tension release device of claim 1, wherein said actuator is a first actuator and said anti-friction release mechanism is a first anti-friction release mechanism, the tension release device comprising:
    a second actuator, said second actuator developing a force at the selected time, based on a phase change of a metal alloy contained in said second actuator; and
    a second anti-friction release mechanism that cooperates with said first anti-friction release mechanism to retain the pin until the selected time, whereupon at least one of said first and second anti-friction release mechanisms releases the pin in response to force developed by a respective one said first and second actuators.

15. A tension release device for retaining a pin subject to a tension force and for selectively releasing the pin, the tension release device comprising:
    an actuator that develops a force at a selected time, based on a phase change of a metal alloy contained in said actuator;
    an anti-friction release mechanism that retains the pin until the selected time, whereupon the anti-friction release mechanism releases the pin in response to the force developed by said actuator; and a housing in which said anti-friction release mechanism is disposed;

wherein said anti-friction release mechanism comprises:
a pawl that is rotatably connected to said housing; and
a shuttle, moveable with respect to said housing and said pawl in response to the force developed by said actuator;

wherein the pin is retained by said pawl when said pawl is oriented in an initial position, said pawl being engaged with the pin so that the tension force on the pin tends to prevent the pawl from rotating in a first direction, and said pawl being engaged with said shuttle so that said pawl is prevented from rotating in a second direction opposite said first direction.

16. The tension release device of claim 15, wherein said shuttle comprises:
a shuttle body connected to said actuator; and
a first friction relief device connected to said shuttle body.

17. The tension release device of claim 16, wherein said first friction relief device comprises one or more bearings that provide a rolling engagement between said shuttle and said pawl.

18. The tension release device of claim 17, wherein each of said one or more bearings is lubricated with a space lubricant.

19. The tension release device of claim 17, wherein each of said one or more bearings comprises: an inner race, an outer race, and rolling elements disposed between said inner race and said outer race; and
wherein said rolling elements formed of a ceramic material and said inner race and said outer race are both formed of a metal.

20. The tension release device of claim 19, wherein said ceramic material is silicon nitride and said metal is stainless steel.

21. The tension release device of claim 17, wherein said one or more bearings have rolling elements, said rolling elements being selected from the group consisting of: balls and rollers.

22. The tension release device of claim 17, wherein said one or more bearings are needle bearings.

23. The tension release device of claim 16, wherein said shuttle further comprises:
a second friction relief device connected to said shuttle body.

24. The tension release device of claim 23, wherein said second friction relief device comprises one or more bearings that provide a rolling engagement between said shuttle and said housing.

25. The tension release device of claim 24, wherein each of said one or more bearings is lubricated with a space lubricant.

26. The tension release device of claim 24, wherein each of said one or more bearings comprises: an inner race, an outer race, and rolling elements disposed between said inner race and said outer race; and
wherein said rolling elements formed of a ceramic material and said inner race and said outer race are both formed of a metal.

27. The tension release device of claim 26, wherein ceramic material is silicon nitride and said metal is stainless steel.

28. The tension release device of claim 24, wherein said one or more bearings have rolling elements, said rolling elements being selected from the group consisting of: balls and rollers.

29. The tension release device of claim 24, wherein said one or more bearings are needle bearings.

30. The tension release device of claim 14, wherein a first friction relief device is disposed so as to provide for a rolling engagement between said pawl and said shuttle.

31. The tension release device of claim 30, wherein a second friction relief device is disposed so as to provide for a rolling engagement between said housing and said shuttle.

32. The tension release device of claim 15, wherein said pawl rotates away from said initial position when said shuttle moves in response to the force developed by said actuator, thereby releasing said pin.

33. A spacecraft comprising:
a main body;
an appendage attached to a periphery of said main body; and
a tension release device attached to a periphery of said main body, said tension release device initially maintaining said appendage in a folded configuration and releasing said appendage to unfold at a selected time after the spacecraft has been placed into space;
wherein said tension release device comprises:
an actuator that develops a force at a selected time, based on a phase change of a metal alloy contained in said actuator, and
an anti-friction release mechanism that retains the appendage via a pin until the selected time, whereupon the anti-friction release mechanism releases the pin in response to the force developed by said actuator.

34. The spacecraft of claim 33, wherein said actuator comprises:
a cylinder having an end wall;
a piston disposed inside said cylinder;
a spring disposed so as to bias said piston to move toward said end wall;
a mass of said metal alloy disposed between said piston and said end wall; and
a heat source disposed about said cylinder.

35. The spacecraft of claim 34, wherein composition of said metal alloy is selected so that said metal alloy has a melting temperature greater than foreseeable ambient temperatures.

36. The spacecraft of claim 35, wherein said melting temperature is in the range of about 100° C. to 150° C.

37. The spacecraft of claim 36, wherein said melting temperature is about 125° C.

38. The spacecraft of claim 34, wherein said metal alloy is comprised essentially of lead and bismuth.

39. The spacecraft of claim 38, wherein said metal alloy is the eutectic alloy of bismuth and lead.

40. The spacecraft of claim 38, wherein said metal alloy contains about 44.5 percent lead and about 55.5 percent bismuth.

41. The spacecraft of claim 34, wherein said heat source, when energized, raises the temperature of said mass of metal alloy above the melting point of said metal alloy.

42. The spacecraft of claim 41, wherein said mass of metal alloy undergoes a phase change when said heat source is energized.

43. The spacecraft of claim 42, wherein said mass of metal alloy is solid phase prior to said heat source being energized, and said mass of metal alloy changes from solid phase to liquid phase when said heat source is energized; and
wherein the liquid phase mass of metal alloy flows out of the space between said piston and said end wall, thereby permitting said piston to move toward said end wall.

44. The spacecraft of claim 34, wherein said heat source comprises plural independent heating elements.

45. The spacecraft of claim 44, wherein each of said heating elements is a thin, flexible resistance heater.

46. A spacecraft comprising:
   a main body;
   an appendage attached to a periphery of said main body; and
   a tension release device attached to a periphery of said main body, said tension release device initially maintaining said appendage in a folded configuration and releasing said appendage to unfold at a selected time after the spacecraft has been placed into space;
   wherein said tension release device comprises:
      an actuator that develops a force at a selected time, based on a phase change of a metal alloy contained in said actuator,
      an anti-friction release mechanism that retains the appendage via a pin until the selected time, whereupon the anti-friction release mechanism releases the pin in response to the force developed by said actuator, and
      a housing in which said anti-friction release mechanism is disposed;
   wherein said anti-friction release mechanism comprises:
      a pawl that is rotatably connected to said housing; and
      a shuttle, moveable with respect to said housing and said housing and said pawl in response to the force developed by said actuator;
      wherein the pin is retained by said pawl when said pall is oriented in an initial position, said pawl being engaged with the pin so that the tension force on the pin tends to prevent the pawl from rotating in a first direction, and said pawl being engaged with said shuttle so that said pawl is prevented from rotating in a second direction opposite said first direction.

47. The spacecraft of claim 46, wherein said pawl rotates away from said initial position when said shuttle moves in response to the force developed by said actuator, thereby releasing said pin.

48. The spacecraft of claim 46, wherein said shuttle comprises:
   a shuttle body connected to said actuator; and
   a first friction relief device connected to said shuttle body.

49. The spacecraft of claim 48, wherein said first friction relief device comprises one or more bearings that provide a rolling engagement between said shuttle and said pall.

50. The spacecraft of claim 49, wherein each of said one or more bearings is lubricated with a space lubricant.

51. The spacecraft of claim 49, wherein each of said one or more bearings comprises: an inner race, an outer race, and rolling elements disposed between said inner race and said outer race; and
   wherein said rolling elements formed of a ceramic material and said inner race and said outer race are both formed of a metal.

52. The spacecraft of claim 51, wherein said ceramic material is silicon nitride and said metal is stainless steel.

53. The spacecraft of claim 49, wherein said one or more bearings have rolling elements, said rolling elements being selected from the group consisting of: balls and rollers.

54. The spacecraft of claim 49, wherein said one or more bearings are needle bearings.

55. The spacecraft of claim 48, wherein said shuttle further comprises:
   a second friction relief device connected to said shuttle body.

56. The spacecraft of claim 55, wherein said second friction relief device comprises one or more bearings that provide a rolling engagement between said shuttle and said housing.

57. The spacecraft of claim 56, wherein each of said one or more bearings is lubricated with a space lubricant.

58. The spacecraft of claim 56, wherein each of said one or more bearings comprises: an inner race, an outer race, and rolling elements disposed between said inner race and said outer race; and
   wherein said rolling elements formed of a ceramic material and said inner race and said outer race are both formed of a metal.

59. The spacecraft of claim 58, wherein said ceramic material is silicon nitride and said metal is stainless steel.

60. The spacecraft of claim 56, wherein said one or more bearings have rolling elements, said rolling elements being selected from the group consisting of: balls and rollers.

61. The spacecraft of claim 56, wherein said one or more bearings are needle bearings.

62. The spacecraft of claim 46, wherein a first friction relief device is disposed so as to provide for a rolling engagement between said pawl and said shuttle.

63. The spacecraft of claim 62, wherein a second friction relief device is disposed so as to provide for a rolling engagement between said housing and said shuttle.

64. A tension release device for retaining a pin subject to a tension force and for selectively releasing the pin, the tension release device comprising:
   an actuator that develops an actuation force at a selected time, based on a phase change of a metal alloy contained in said actuator, said actuation force having a substantially smaller magnitude that said tension force, and
   means for substantially isolating said actuator from the tension force so that the pin is released in response to said actuation force.

65. The tension release device of claim 64, wherein said means for substantially isolating comprises a friction relief structure.

66. The tension release device of claim 65, wherein said friction relief structure comprises plural bearings.

67. The tension release device of claim 64, wherein said actuation force is at least an order of magnitude less than the tension force.

68. The tension release device of claim 64, wherein said actuation force is about two orders of magnitude less than the tension force.

69. An actuator for providing a linear actuation motion at a selected time, the actuator comprising:
   a cylinder having an end wall,
   a piston disposed inside said cylinder,
   a spring disposed so as to bias said piston to move toward said end wall,
   a mass of metal alloy disposed between said piston and said end wall, and
   a heat source, disposed adjacent said cylinder, for generating heat when energized at the selected time so as to melt said mass of metal alloy and thereby release energy stored in said spring;
   wherein the release of energy stored in said spring moves said piston and provides the linear actuation motion, the linear actuation motion being caused solely by said spring.

70. The actuator of claim 69, wherein composition of said metal alloy is selected so that said metal alloy has a melting temperature greater than foreseeable ambient temperatures.

71. The actuator of claim 70, wherein said melting temperature is in the range of about 100° C. to 150° C.

72. The actuator of claim 71, wherein said melting temperature is about 125° C.

73. The actuator of claim 69, wherein said metal alloy is comprised essentially of lead and bismuth.

74. The actuator of claim 73, wherein said metal alloy is the eutectic alloy of bismuth and lead.

75. The actuator of claim 73, wherein said metal alloy contains about 44.5 percent lead and about 55.5 percent bismuth.

76. The actuator of claim 69, wherein said mass of metal alloy is solid phase prior to said heat source being energized, and said mass of metal alloy changes from solid phase to liquid phase when said heat source is energized; and wherein the liquid phase mass of metal alloy flows out of the space between said piston and said end wall, thereby permitting said piston to move toward said end wall.

77. The actuator of claim 76, wherein said heat source comprises plural independent heating elements.

78. The actuator of claim 77, wherein each of said heating elements is a thin, flexible resistance heater.

79. A tension release device for retaining a pin subject to a tension force and for selectively releasing the pin, the tension release device comprising:

an actuator that develops a force at a selected time, based on a phase change of a metal alloy contained in said actuator;

an anti-friction release mechanism that retains the pin until the selected time, whereupon the anti-friction release mechanism releases the pin in response to the force developed by said actuator; and a housing in which said anti-friction release mechanism is disposed;

wherein said anti-friction release mechanism comprises:
a pawl that is rotatably connected to said housing and engaged with the pin in an initial position; and
a shuttle, moveable with respect to said housing and said pawl in response to the force developed by said actuator.

80. A tension release device for retaining a pin subject to a tension force and for selectively releasing the pin, the tension release device comprising:

an actuator that develops a force at a selected time, based on a phase change of a metal alloy contained in said actuator; and an anti-friction release mechanism that retains the pin until the selected time, whereupon the anti-friction release mechanism releases the pin in response to the force developed by said actuator;

wherein said anti-friction release mechanism comprises:
a pawl that is engaged with the pin in an initial position; and
a shuttle, in rolling engagement with said pawl and being moveable with respect to said pawl in response to the force developed by said actuator.

81. A tension release device for retaining a pin subject to a tension force and for selectively releasing the pin, the tension release device comprising:

an actuator that develops a force at a selected time, based on a phase change of a metal alloy contained in said actuator;

an anti-friction release mechanism that retains the pin until the selected time, whereupon the anti-friction release mechanism releases the pin in response to the force developed by said actuator; and a housing in which said anti-friction release mechanism is disposed;

wherein said anti-friction release mechanism comprises:
a pawl that is engaged with the pin in an initial position; and
a shuttle, in rolling engagement with both said pawl and said housing, the shuttle being moveable with respect to said housing and said pawl in response to the force developed by said actuator.

82. A spacecraft comprising:

a main body;

an appendage attached to a periphery of said main body; and a tension release device attached to a periphery of said main body, said tension release device initially maintaining said appendage in a folded configuration and releasing said appendage to unfold at a selected time after the spacecraft has been placed into space;

wherein said tension release device comprises:
an actuator that develops a force at a selected time, based on a phase change of a metal alloy contained in said actuator; and
an anti-friction release mechanism that retains the pin until the selected time, whereupon the anti-friction release mechanism releases the pin in response to the force developed by said actuator;

wherein said anti-friction release mechanism comprises:
a pawl that is engaged with the pin in an initial position; and
a shuttle, in rolling engagement with said pawl and being moveable with respect to said pawl in response to the force developed by said actuator.

* * * * *

UNITED STATES PATENT AND TRADEMARK OFFICE
CERTIFICATE OF CORRECTION

| | | |
|---|---|---|
| PATENT NO. | : 6,119,984 | Page 1 of 1 |
| APPLICATION NO. | : 09/356200 | |
| DATED | : September 19, 2000 | |
| INVENTOR(S) | : Edward J. Devine | |

It is certified that error appears in the above-identified patent and that said Letters Patent is hereby corrected as shown below:

| | | |
|---|---|---|
| COLUMN 3, | LINE 46, | after "magnitude" change "that" to --than-- |
| COLUMN 4, | LINE 25, | change "11–11" to --II-II-- |
| COLUMN 5, | LINE 52, | after "as illustrated" and before "the" delete "this" |
| COLUMN 7, | LINE 28, | change "face 260" to --wall 260-- |
| COLUMN 7, | LINE 47, | after "to" and before "held" insert --be-- |

Signed and Sealed this

Twentieth Day of January, 2009

JON W. DUDAS
*Director of the United States Patent and Trademark Office*